(12) United States Patent
Jiang et al.

(10) Patent No.: US 10,678,727 B2
(45) Date of Patent: Jun. 9, 2020

(54) METHOD AND DEVICE FOR PROCESSING NETWORK DATA TRAFFIC BASED ON DISTRIBUTED STRUCTURE

(71) Applicant: Hillstone Networks, Corp., Sunnyvale, CA (US)

(72) Inventors: Dongyi Jiang, San Jose, CA (US);
Linyang Shu, San Jose, CA (US);
Jiangbo Nie, San Jose, CA (US); Ye Zhang, Sunnyvale, CA (US); Yu Jia, Beijing (CN); Qijun Yang, Beijing (CN); Juxi Li, Beijing (CN)

(73) Assignee: HILLSTONE NETWORKS CORP., Santa Clara, CA (US)

( * ) Notice: Subject to any disclaimer, the term of this patent is extended or adjusted under 35 U.S.C. 154(b) by 0 days.

(21) Appl. No.: 16/186,415

(22) Filed: Nov. 9, 2018

(65) Prior Publication Data

US 2020/0004711 A1    Jan. 2, 2020

(30) Foreign Application Priority Data

Jun. 29, 2018   (CN) .......................... 2018 1 0714104

(51) Int. Cl.
*G06F 13/40* (2006.01)
*G06F 13/16* (2006.01)
*G06F 3/06* (2006.01)

(52) U.S. Cl.
CPC .......... *G06F 13/4004* (2013.01); *G06F 3/061* (2013.01); *G06F 3/067* (2013.01); *G06F 13/16* (2013.01)

(58) Field of Classification Search
CPC combination set(s) only.
See application file for complete search history.

(56) References Cited

U.S. PATENT DOCUMENTS

| 5,710,907 | A  | * | 1/1998  | Hagersten  | G06F 12/0813 |
|  |  |  |  |  | 711/148 |
| 7,206,818 | B2 | * | 4/2007  | Okochi  | G06F 15/167 |
|  |  |  |  |  | 709/212 |
| 8,806,169 | B1 | * | 8/2014  | Wang  | G06F 9/5016 |
|  |  |  |  |  | 711/170 |
| 2003/0009643 | A1 | * | 1/2003 | Arimilli | G06F 12/0813 |
|  |  |  |  |  | 711/155 |
| 2003/0177325 | A1 | * | 9/2003 | Jann | G06F 12/0284 |
|  |  |  |  |  | 711/165 |
| 2010/0250868 | A1 | * | 9/2010 | Oshins | G06F 12/0284 |
|  |  |  |  |  | 711/154 |
| 2017/0017674 | A1 | * | 1/2017 | Scheuer | G06F 16/2282 |
| 2018/0365167 | A1 | * | 12/2018 | Eckert | G06F 12/1036 |
| 2019/0020601 | A1 | * | 1/2019 | Liu | H04L 41/0803 |

* cited by examiner

*Primary Examiner* — Raymond N Phan
(74) *Attorney, Agent, or Firm* — Hillstone Networks Corp.

(57) ABSTRACT

A method for processing network data traffic includes obtaining a first distributed structure corresponding to a program based on a first storage structure, wherein the program is configured to process network data traffic; dividing a network device based on a second storage structure into a plurality of execution units, wherein the plurality of execution units is configured to execute the program; mapping the first distributed structure and the plurality of execution units to obtain a second distributed structure; and controlling the plurality of execution units to process network data traffic based on the second distributed structure.

12 Claims, 13 Drawing Sheets

METHOD AND DEVICE FOR PROCESSING NETWORK DATA TRAFFIC BASED ON DISTRIBUTED STRUCTURE

RELATED APPLICATION DATA

This application claims priority to and the benefit of Chinese Patent Application No. 201810714104.7, filed on Jun. 29, 2018, pending. The entire disclosure of the above application is expressly incorporated by reference herein.

FIELD

This disclosure relates to the field of computer networks, and in particular to a method and a device for processing network data based on a distributed structure.

BACKGROUND

The network device can implement storing and forwarding of data packets, and create and store context information for data forwarding. The network device according to the prior art can adopt a multi-processor architecture system to complete the work of storing and forwarding data, etc. The multi-processor architecture mainly includes UMA (Uniform Memory Access) and NUMA (Non-Uniform Memory Access). In order to improve the efficiency of accessing data and processing data, the data access architecture shown in FIG. 1 can be employed, to port the current parallel processing software under UMA structure to the hardware platform with NUMA structure.

Figure 1:
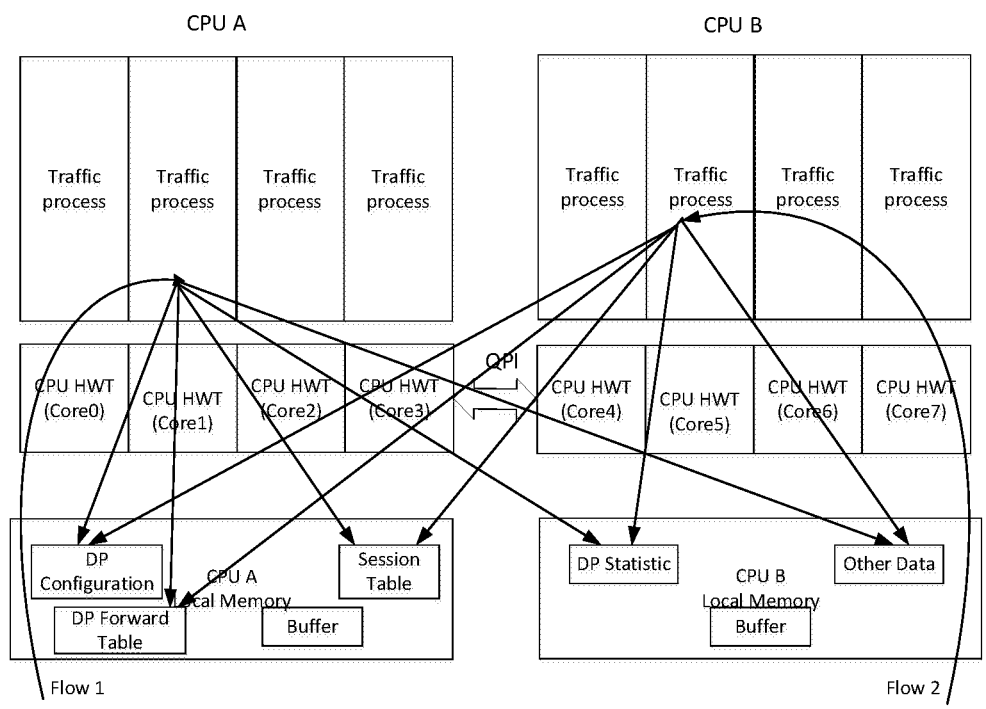

As shown in FIG. 1, after simply porting the software of the UMA structure to the hardware platform with the NUMA structure, the data on the hardware platform with the NUMA structure will be allocated to the local memory of multiple processors. In FIG. 1, the local memory of CPU A stores DP (Data Plane) Configuration, DP Forwarding Table, Session Table, Buffer; the local memory of CPU B stores DP Statistic, Other data (refers to the data to be stored during packet processing), Buffer. In addition, in FIG. 1, CPU HVVT (HardWare Thread) is the hardware core or hardware thread of the CPU. Data is accessed between different processors via an interconnect bus between the CPUs, such as the QPI bus. The above data stored in processor memory has only one copy globally and can only exist in the local memory of one processor, either CPU A or CPU B. Therefore, for certain data, it is stored either in the local memory of CPU A or in the local memory in CPU B. Since one processor need to access all the above data during packet processing, there will always be some remote memory access with high latency. The high-frequency remote memory access greatly reduces the efficiency of the data processing of network device. In addition, for some network devices, such as FW/NGFW, IDS/IPS, WAF, ADC, BDS, Router, etc., the overall performance of the network device may not improve if the software under UMA structure is simply ported to the hardware platform with NUMA structure, although the number of available processors or the number of processor cores is increased.

Figure 2:
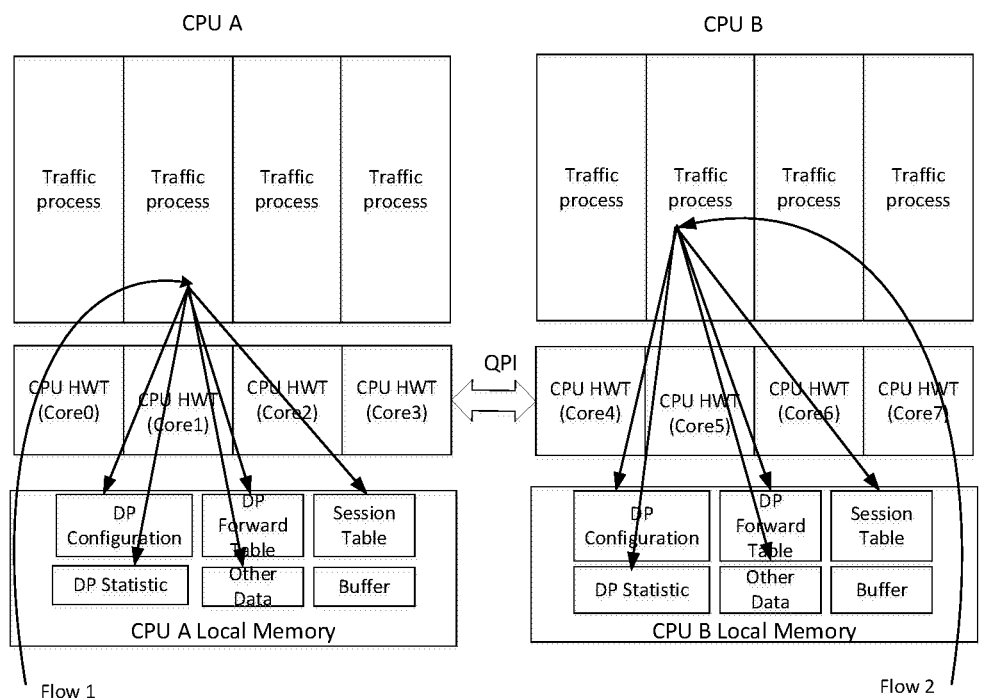

To solve the above problem, a data access architecture as shown in FIG. 2 is proposed. Firstly, find the frequently accessed data during processing, such as Forward Table, Session Table, DP Configuration, DP Statistic, etc., then copy these frequently accessed data to the local memory of each processor in the NUMA structure. So, there is a copy of data in the physical memory of each processor under the NUMA structure. Secondly, modify the software program, adding the processor identifier to the index table of the local data, so that when the core or HWT of a certain processor process the data packet, it can access a local copy of the above data, thereby reducing the need for remote data access and reducing performance degradation impact with NUMA structure.

However, this solution requires a large amount of modifications on original software, and it may lead to uncertainties of execution, and increases the workload of software maintenance. In addition, for some global data that need to be written frequently, such as DP Statistic and Session data, multiple copies of the same data do not meet the needs of real-time query.

There is no existing solution for the performance degradation on data access, caused by migrating the distributed structure software program of the network device based on the UMA structure to the hardware platform of the network device based on the NUMA structure.

SUMMARY

This disclosure provides a method and device for processing data based on a distributed structure, so as to solve technical problems of data access performance degradation when porting a distributed structure software program of a network device based on UMA structure to a network device based on NUMA structure.

According to an aspect, a method for processing data based on a distributed structure is proposed, including: acquiring a first distributed structure corresponding to a program based on a first storage structure, wherein the program is used to process network data traffic stored in local memory; dividing the network device based on the second storage structure into a plurality of execution units, wherein the plurality of execution units are used to execute the program; mapping the first distributed structure to the plurality of execution units to obtain the second distributed structure; controlling multiple execution units to process network data traffic in local memory based on the second distributed structure.

Further, the method for processing data based on the distributed structure also includes: determining whether the program of the first storage structure supports the first distributed structure; and acquiring the first distributed structure when the program of the first storage structure supports the first distributed structure.

Further, the network device has at least one processor, each processor having a plurality of processing units, wherein each of the plurality of execution units has a corresponding processing unit, and controls the plurality of processing units to process the network data traffic in local memory of corresponding processor.

Further, the plurality of execution units at least includes: one first execution unit and at least one second execution unit, wherein the first execution unit is to run a control program of the network device, and at least one second execution unit is to process network data traffic in the local memory.

Further, in a case where there are multiple processors on the device, the first execution unit processes network data traffic in the local memory of any one of the plurality of processors; and the second execution unit process network data traffic only in the local memory of the corresponding processor.

Further, the data is forwarded between the first execution unit and at least one of the second execution units through an interconnection bus between the processors.

Further, in a case where the number of the second execution units is plural, the data is forwarded between the pluralities of second execution units by the interconnection bus between the processors.

According to another aspect, a device for processing data based on a distributed structure is provided, including: an extracting module, configured to acquire a first distributed structure corresponding to a program based on a first storage structure, where The program is configured to process network data traffic in the local memory; the processing module, configured to divide the network device into multiple execution units based on the second storage structure, where multiple execution units are used to execute the program; the mapping module, configured to map the first distributed structure to the plurality of execution units to obtain a second distributed structure; the control module, configured to control the plurality of execution units to process network data traffic in the local memory based on the second distributed structure.

According to another aspect, there is also provided a storage medium including a stored program and to-be-processed data, wherein the program executes a method of processing data based on a distributed structure.

According to another aspect, there is also provided a processor for running a program, wherein a method for processing data based on a distributed structure is executed by the processor.

In one or more embodiments described herein, a distributed architecture is applied to a network device design based on NUMA structure. First, acquiring a first distributed structure corresponding to a program based on the first storage structure, and simultaneously the network device in the second storage structure is divided into a plurality of execution units, and then the first distributed structure is mapped to the plurality of execution units to obtain a second distributed structure, and finally controlling multiple execution units to process network data traffic based on the second distributed structure in local memory. The program is used to process network data traffic in local memory, the multiple execution units are used to execute the program, and the data access efficiency of the network device based on the NUMA structure is improved. By solving the problem of data access performance degradation, based on distributed structure software program for network devices with UMA structure ported to NUMA structures. One or more embodiments described herein improve the processing efficiency of the network device, thereby solving the problem of data access performance degradation caused by directly running software program designed for network devices with UMA structure on NUMA structures.

A method for processing data based on a distributed structure, includes: obtaining a first distributed structure corresponding to a program based on the first storage structure, wherein the program is configured to process network data traffic in the local memory; dividing a network device based on the second storage structure into a plurality of execution units, wherein the plurality of execution units is configured to execute the program; mapping the first distributed structure and the plurality of execution units to obtain a second distributed structure; and controlling the plurality of execution units to process network data traffic in the local memory based on the second distributed structure.

Optionally, the first distributed structure corresponding to the program based on the first storage structure is obtained, including: determining whether the program of the first storage structure supports the first distributed structure; and in the case where the program of the first storage structure supports the first distributed structure, obtaining a first distributed structure corresponding to a program based on the first storage structure.

Optionally, network device has at least one processor, and each processor has a plurality of processing units, wherein each of the plurality of execution units has a corresponding processor, and the processor controls the plurality of processing units to process a network data traffic in the local memory of the corresponding processor.

Optionally, the plurality of execution units at least includes: one first execution unit and one second execution unit, wherein the first execution unit is used to execute a program that controls the network device, and the second execution unit is configured to process network data traffic in the local memory.

Optionally, there is more than one processor, the first execution unit performs data access and process in the memory of any processors, and the second execution unit performs data access and process in a local memory of a corresponding processor.

Optionally, the first execution unit and at least one second execution unit forward data through the interconnect bus between processors.

Optionally, in the case where there are more than one second execution units, the plurality of the second execution unit forward data through the interconnect bus between processors.

A storage medium stores program and data that the program processes, wherein the program performs data process based on the distributed structure according to any of the above items.

A processor is configured to run a program, wherein the program performs data process based on the distributed structure according to any of the above items.

A device for processing data based on a distributed structure, includes: an extracting module, configured to acquire a first distributed structure corresponding to the program based on the first storage structure, where the program is configured to process network data traffic in local memory; a processing module, configured to divide the network device based on the second storage structure into multiple execution units, where the plurality of execution units is configured to execute the program; a mapping module, configured to perform mapping the first distributed structure and the multiple execution units, and to get the second distributed structure; and a control module, configured to control the plurality of execution units to process network data traffic in the local memory based on the second distributed structure.

A method for processing network data traffic, includes: obtaining a first distributed structure corresponding to a program based on a first storage structure, wherein the program is configured to process network data traffic; dividing a network device based on a second storage structure into a plurality of execution units, wherein the plurality of execution units is configured to execute the program; mapping the first distributed structure and the plurality of execution units to obtain a second distributed structure; and controlling the plurality of execution units to process network data traffic based on the second distributed structure.

Optionally, the act of obtaining the first distributed structure comprises: determining whether the program supports the first distributed structure; and obtaining the first distributed structure corresponding to the program if the program supports the first distributed structure.

Optionally, network device has at least one processor, and the at least one processor has a plurality of processing units.

Optionally, the execution units has corresponding processors.

Optionally, at least one of the processors is configured to control a plurality of processing units to process the network data traffic.

Optionally, the network device comprises a plurality of processors, and the plurality of execution units includes a first execution unit and a second execution unit; and wherein the first execution unit is configured to perform data access and process in a processor memory, and the second execution unit is configured to perform data access and process in a local memory of a corresponding processor.

Optionally, the plurality of execution units includes a first execution unit and a second execution unit, the first execution unit is configured to control the network device, and the second execution unit is configured to process at least some of the network data traffic.

Optionally, the first execution unit and the second execution unit are configured to forward data through an interconnect bus between processors.

Optionally, the plurality of execution units includes a first execution unit and multiple second execution units, and wherein the multiple second execution units are configured to forward data through an interconnect bus between processors.

Optionally, the program is configured to process the network data traffic in a local memory.

A storage medium includes a program, wherein the program is configured to perform the method according to any of the above items.

A processor is configured to run a program, wherein the program is configured to perform the method according to any of the above items.

An apparatus includes: an extracting module configured to obtain a first distributed structure corresponding to a program based on a first storage structure, where the program is configured to process network data traffic; a processing module configured to divide a network device based on a second storage structure into a plurality of execution units, where the plurality of execution units is configured to execute the program; a mapping module configured to map the first distributed structure and the plurality of execution units, and to obtain a second distributed structure; and a control module configured to control the plurality of execution units to process network data traffic based on the second distributed structure.

DESCRIPTION OF THE DRAWING FIGURES

Figure 3:
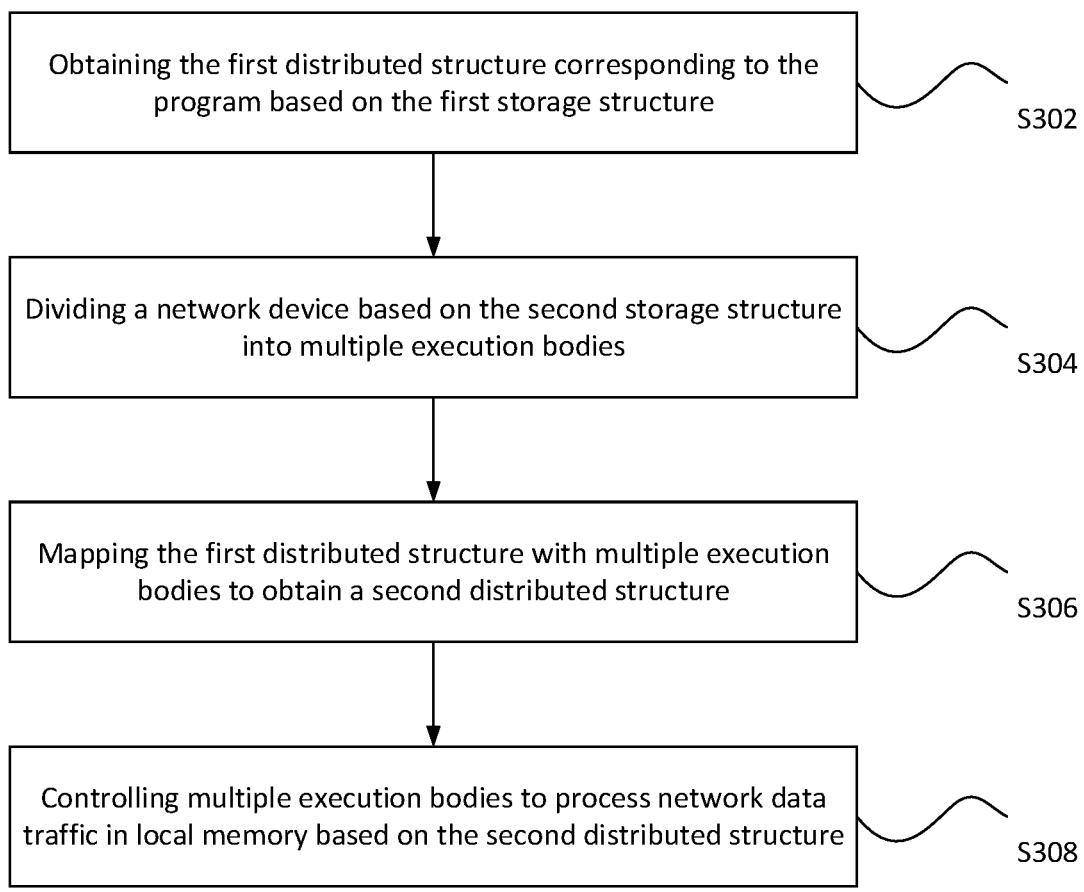

The drawings are intended to provide a further understanding of the embodiments. The illustrative embodiments and the description thereof are not intended to limit the scope of the claimed invention. The above and other features and advantages will become readily apparent to those skilled in the art by the following detailed description of exemplary embodiments thereof with reference to the attached drawings, in which:

FIG. 1 A block diagram of a data access architecture according to the prior art FIG. 2 A block diagram of a data access architecture according to the prior art FIG. 3 Flowchart of a method for processing data based on a distributed structure according to an embodiment.

Figure 4:
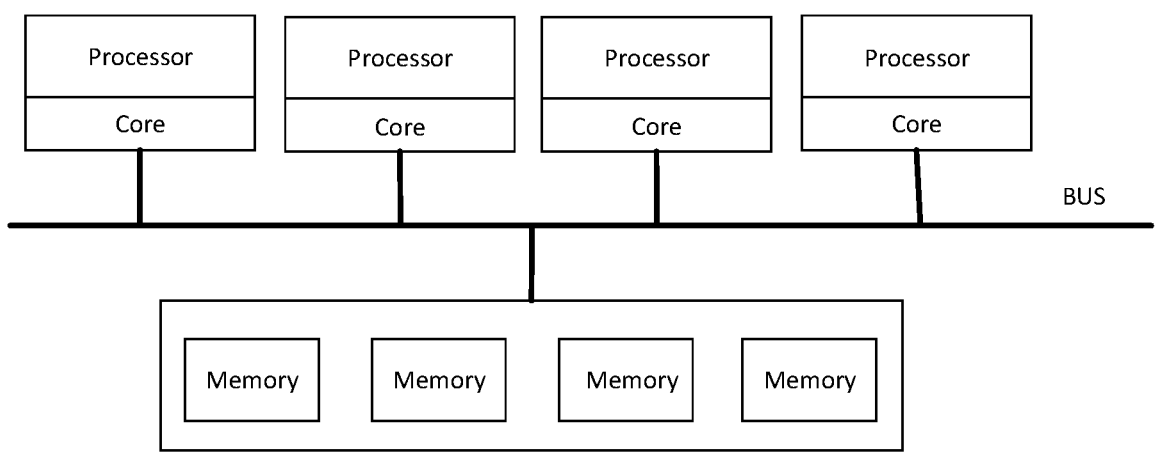

FIG. 4 Block diagram of an optional UMA structure according to an embodiment.

Figure 5:
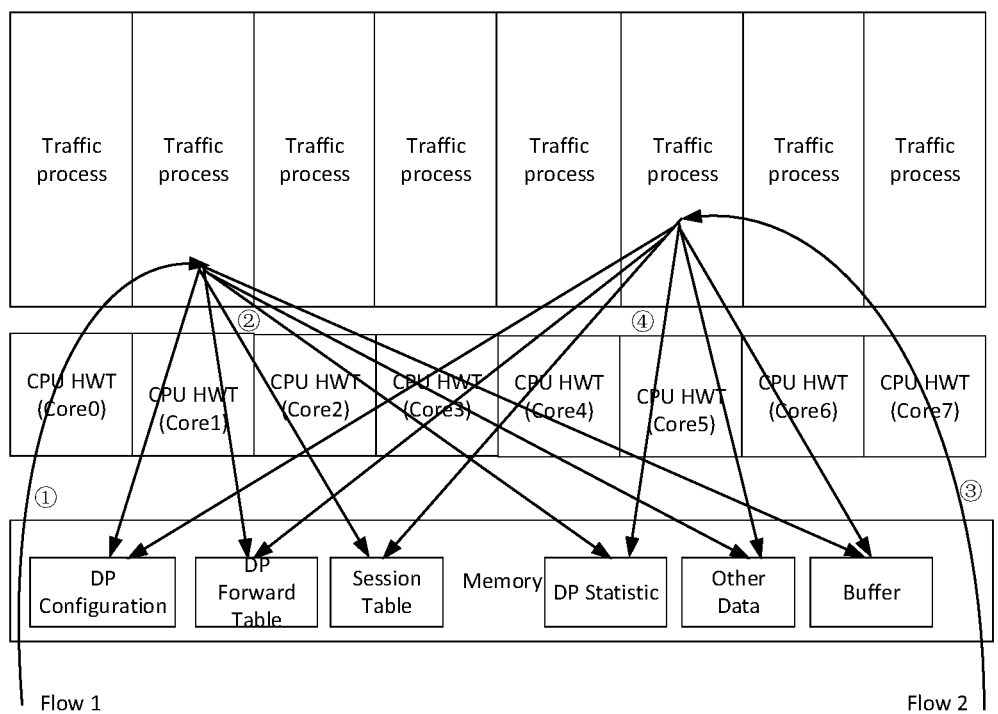

FIG. 5 Block diagram of a software concurrency model under an optional UMA structure according to an embodiment.

Figure 6:
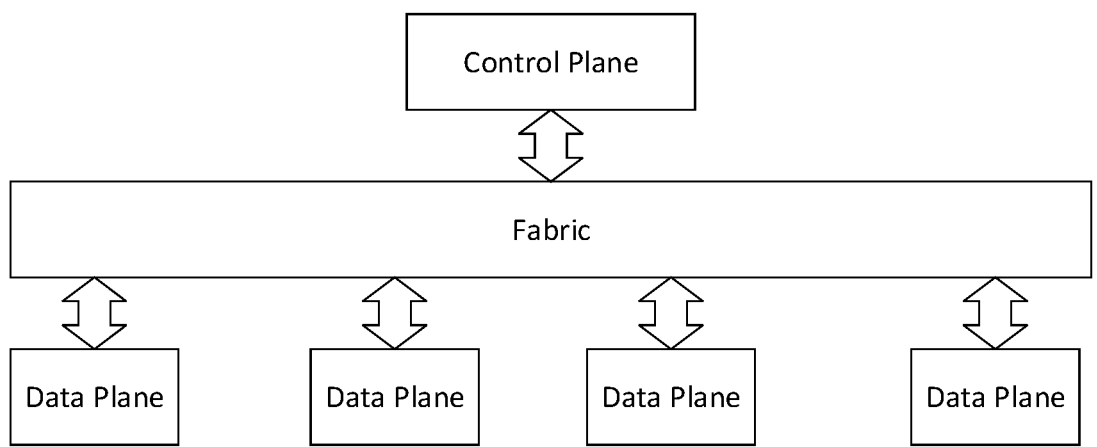

FIG. 6 Block diagram of a distributed architecture of an optional network device according to an embodiment.

Figure 7:
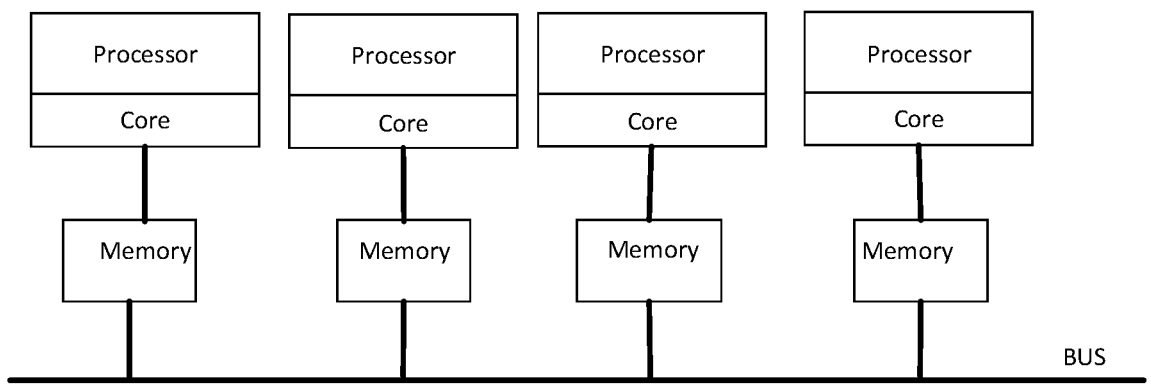

FIG. 7 Block diagram of an optional NUMA structure according to an embodiment.

Figure 8:
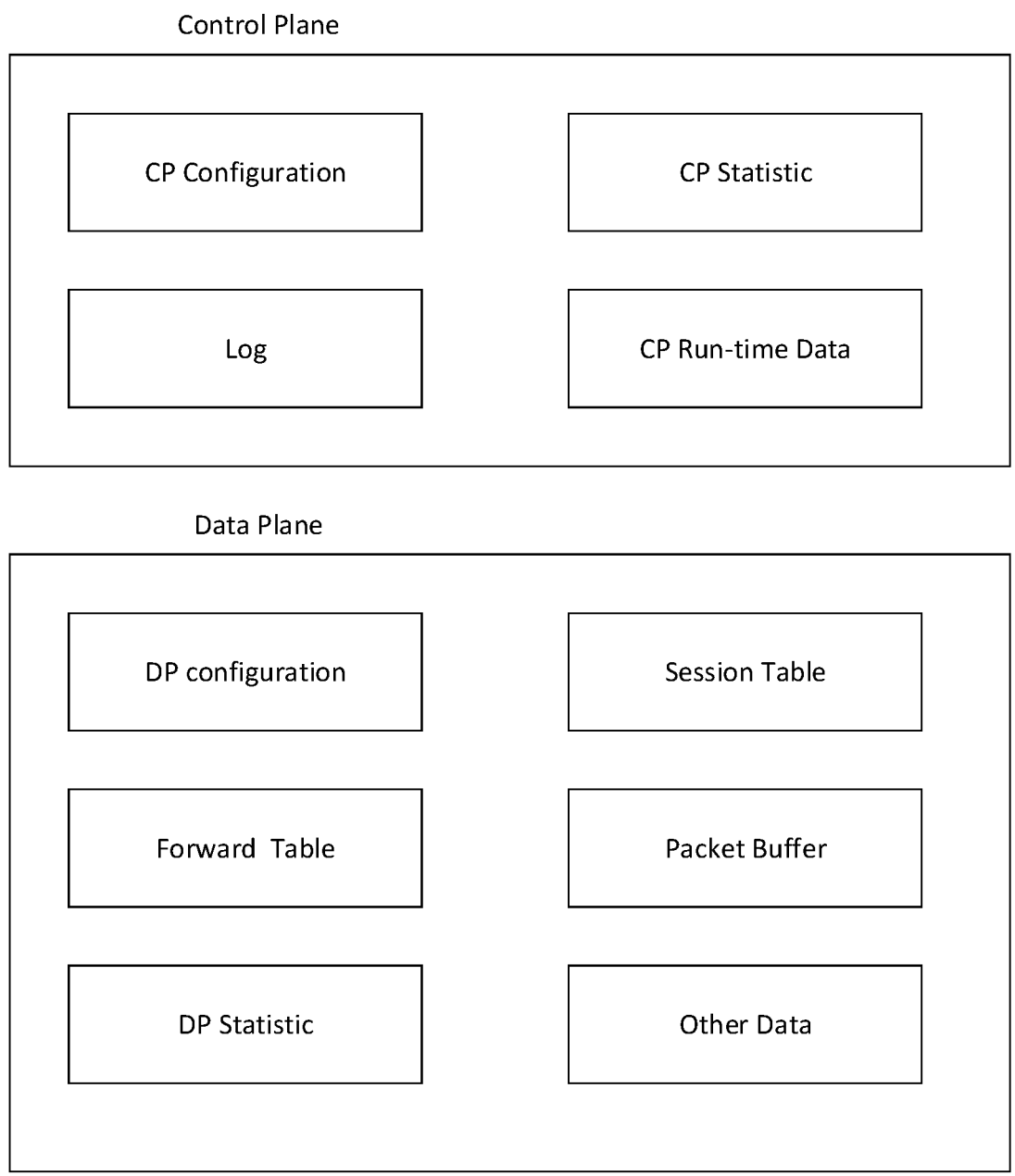

FIG. 8 Block diagram of a basic implementation structure of an optional network device according to an embodiment.

Figure 9:
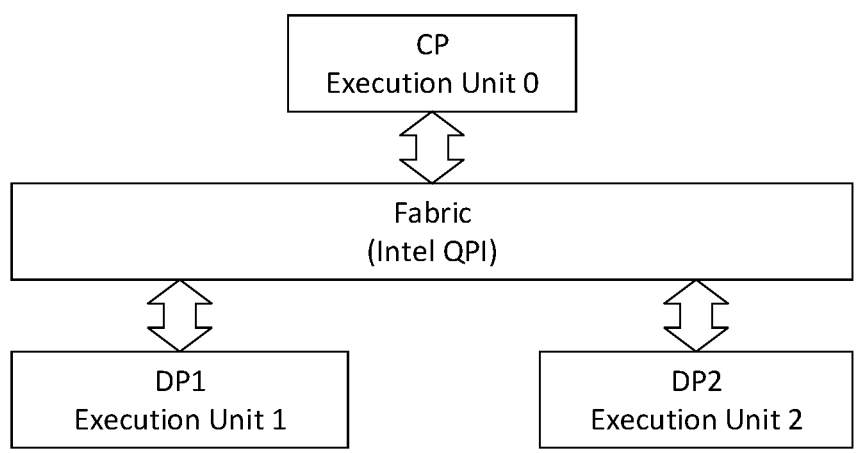

FIG. 9 Block diagram of an optional distributed structure-based network device according to an embodiment.

Figure 10:
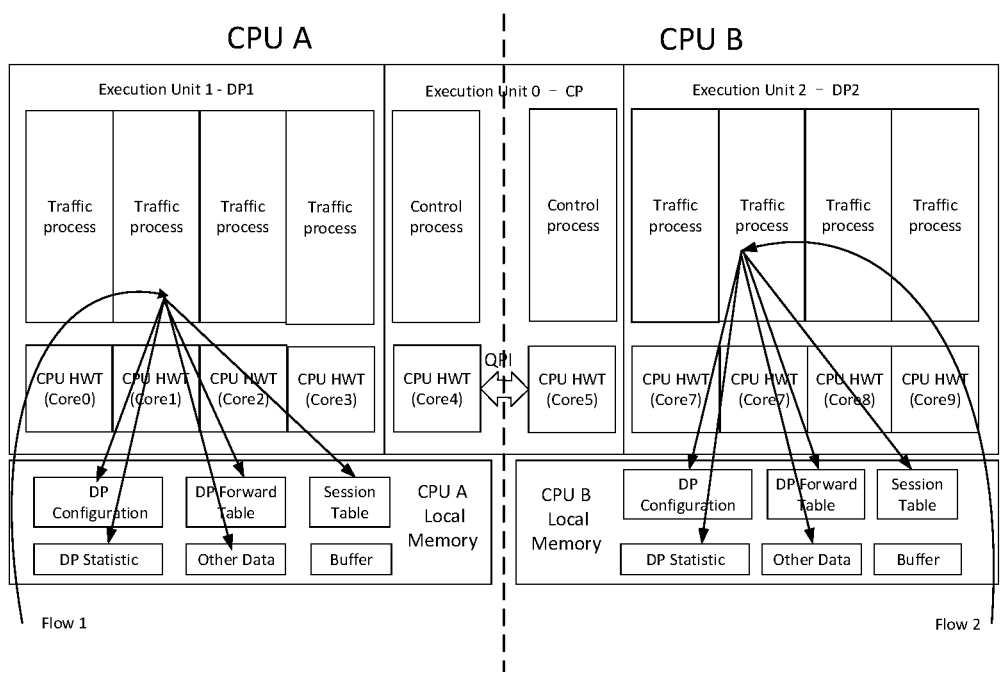

FIG. 10 Block diagram of an optional distributed structure-based network device according to an embodiment.

Figure 11:
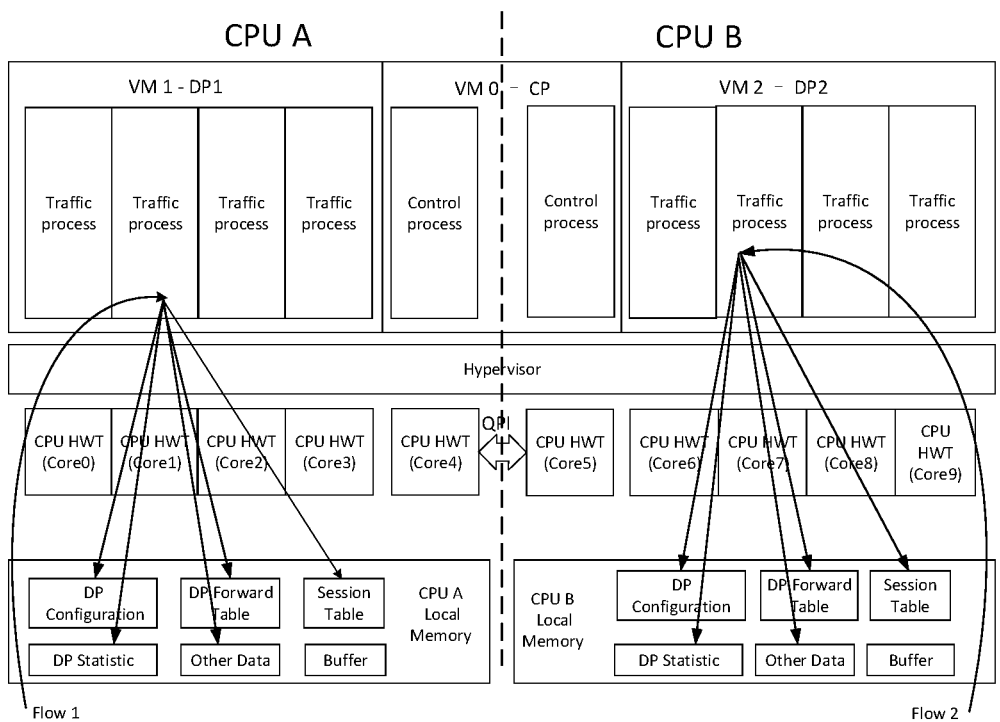

FIG. 11 Block diagram of mapping of a network device with a distributed architecture based on host virtualization technology according to an embodiment.

Figure 12:
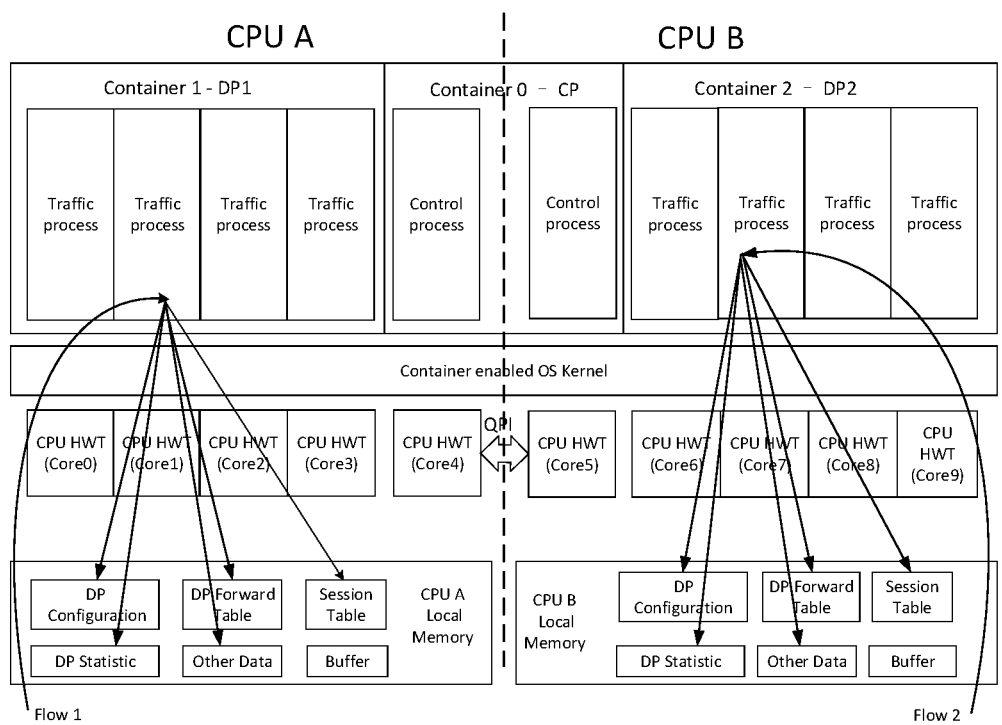

FIG. 12 Block diagram of mapping of an optional network device based distributed architecture based on container technology according to an embodiment.

Figure 13:
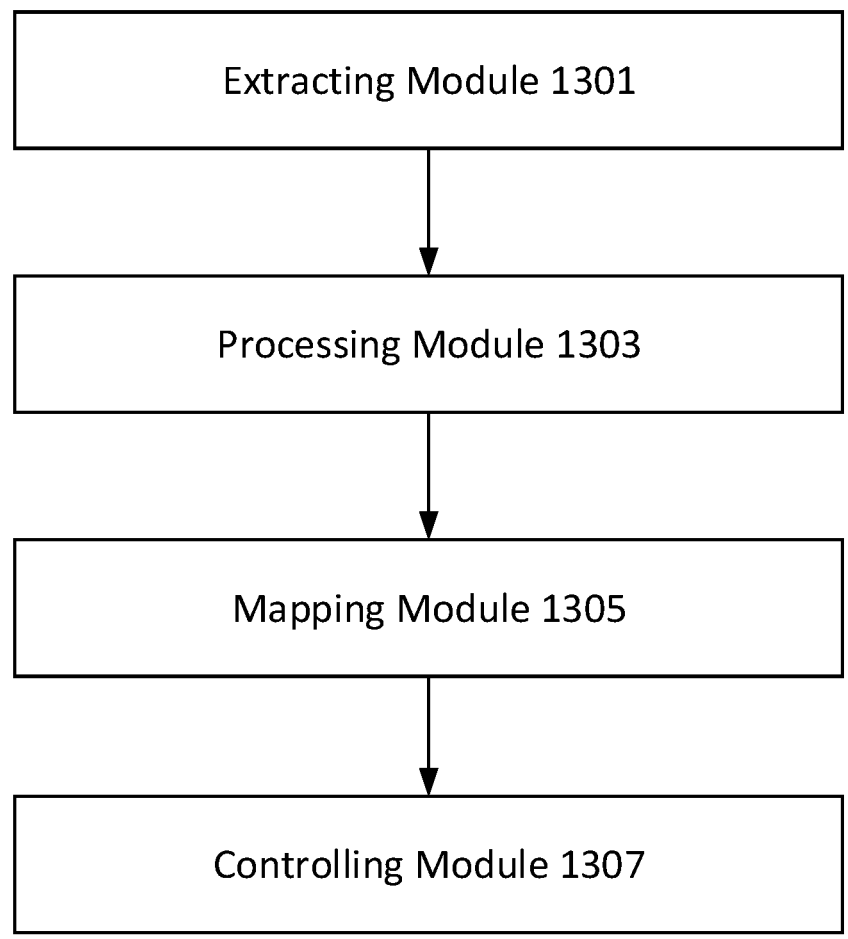

FIG. 13 Block diagram of a device for processing data based on a distributed structure according to an embodiment.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. All embodiments obtained by a person of ordinary skill in the art based on the present disclosure, including any modification of any of the embodiments described herein, without creative efforts shall fall within the scope of protection of the claims.

It should be noted that the terms "first" and "second" is used to distinguish similar objects, and does not have to be used to describe a specific order in the specification, claims, and drawings. It should be understood that the data used may be interchanged where appropriate so that the embodiments described herein can be implemented in the order other than those illustrated or described herein. In addition, the terms "include" and "have" and any variant, intended to cover non-exclusive inclusions, for example, a process, method, system, product or device involving a series of steps or units, is not necessarily limited to those steps or units that are clearly listed, but may include not clear other steps or units listed or specific to these processes, methods, products or devices.

Embodiment 1

In accordance with an embodiment, a method for processing data based on a distributed structure is provided. It should be noted that the steps illustrated in the flowchart of the accompanying drawings may be in a computer system such as a set of computer executable instructions. Although the logical order is shown in the flowchart, in some cases, the steps shown or described may be performed in a different order than here.

FIG. 3 is a flow chart of a method for processing data based on a distributed structure according to an embodiment. As shown in FIG. 3, the method includes the following steps:

Step S302, acquiring a first distributed structure corresponding to the program based on the first storage structure, where the program is written to process network data traffic in the local memory.

In step S302, the network data traffic may include, but is not limited to, a network data packet, and the first storage structure is an UMA structure. FIG. 4 shows an optional UMA structure. As shown in FIG. 4, the UMA structure is the memory sharing architecture of the physical bus that multi-processor shares. The latency of any processor accessing any physical memory chip is the same, and the memory access bandwidth is identical for different processors. Programmers can write parallel execution programs without considering of UMA architecture. Parallel programs can migrate between single-processor multi-core systems and multi-processor multi-core UMA systems without special processing.

In an alternative solution, the network device usually adopts a single-processor multi-core structure, that is, there is only one physical processor on one board, and the physical processor can support multiple cores or support multiple HWTs (HardWare Threads). Each core of processors can achieve indiscriminate access to all physical memory. In order to improve the concurrent processing of data traffic, software design (i.e. program) usually uses a software concurrency model that matches the processor concurrency model, as shown in FIG. 5, a block diagram of the software concurrency model under the UMA structure. As shown in FIG. 5, CPU HWT is the hardware core of the processor or a hardware thread, the traffic processing process is a software process or thread for matching a hardware thread or a hardware core. As shown in FIG. 5, memory is accessed with the same latency and globally accessible to all CPU HWTs, namely, memory is not affiliated with a particular core.

It can be seen from the above that UMA structure is characterized that all cores (hardware threads or hardware cores) have the same access latency and access bandwidth to memory. In the software concurrency model shown in FIG. 5, when the NIC (Network Interface Card) receives the first packet of certain session, it can select a core through the hash as the session core responsible for processing the packet, and the packet is then forwarded to the session core. In the core, as shown in FIG. 5 ①. The core can create a session, and continues to process the packet, i.e., the task of packet processing, as shown in FIG. 5 ②. When the NIC receives the response packet of the same session, it also selects a core as the packet processing core by hash, as shown in FIG. 5 ③. The packet processing core continues to process the packet, as shown in FIG. 5 ④. Thereafter, during the two-way packet processing, multiple reads and writes to session data can be performed. Even though the hash in both directions of the session may select different cores, since the required access time to session memory or other memory for all processors is the same under the UMA structure, the performance of packet processing will not be affected. It can be seen that in the UMA structure, since the memory is global and the access latency is the same, even if the session core and the packet processing core are not the same core, the performance of processing the packet is the same.

In addition, the distributed structure of the network device is an architecture composed of a Control Plane (CP) subsystem, a plurality of Data Plane (DP) subsystems, and a backplane switch (Fabric) subsystem. FIG. 6 shows the distributed architecture diagram of the network device. In FIG. 6, the CP and several DPs are computing subsystems with processors, and there is fabric between CP and DP and between DP and DP. DP can receive and send packets through the fabric. DP can forward packets to each other through the Fabric.

It should be noted that designing a network device based on a consistent storage access structure can improve the processing capacity and performance of a single processor, thereby improving the processing capability of the network device.

Step S304 in FIG. 3, the network device based on the second storage structure is divided into multiple execution units, where multiple execution units are used to execute the program.

In step S304, the second storage structure is a NUMA structure, wherein FIG. 7 shows an optional NUMA structure. As shown in FIG. 7, since the processor accesses the memory chip physically connected thereto (i.e., local memory), and the latency of local memory is relatively small, and the memory chip connected to other processors through the interconnect bus (i.e., remote memory) has a relatively long delay. Therefore, the overall delay of memory access of the NUMA structure depends on access delay for remote memory. Programmers need to consider the existence of NUMA architecture when writing parallel programs. When parallel programs execute, they need to access local memory as much as possible and reduce access to remote memory. When porting parallel programs under uniprocessor multi-cores to the multi-processor multi-core NUMA architecture, if the program is not optimized for the underlying programming mode, its performance will be greatly affected. In some cases, system with multiprocessor NUMA architecture may performance worse than single processor system.

It should be noted that the network devices in this application include, but are not limited to, network traffic security devices, network data forwarding devices, network traffic analysis devices, and network traffic management devices, such as FW/NGFW, IDS/IPS, WAF, ADC, BDS, Router. The network device may be, but not limited to, an Intel x86, AMD CPU device. In the case of a multi-core multi-processor, after the network device based on the NUMA structure receives a packet, the network card of the network device calculates a hash index value according to a specific field of the packet. According to the hash index value, the packet is associated with one processing core of a processor, and the core of the processor is responsible for processing the packet. For the first packet in the received session, the processor's core is also responsible for creating session. The network device can be divided into a Control Plane (CP) and a Data Plane (DP). FIG. 8 shows a block diagram of the basic implementation structure of a network device, and lists the required data components of two planes, wherein the control plane requires components CP Configuration, CP Statistic, Log, CP Run-time Data, and the data plane requires components DP Configuration, Session Table, Forward Table, Packet Buffer, DP Statistic, Other Data. Usually, the control plane is responsible for system configuration, operation monitoring, data acquisition, external communication, and routing/switching protocols. The data plane is usually responsible for packet forwarding.

In addition, under the NUMA structure, multiple physical processors can work concurrently, further improving the capacity of network devices. At the same time, as a performance boost, NUMA requires memory modules to be part of a particular physical processor. Therefore, in NUMA structure, when CPU A only accesses its local memory, its performance is equivalent to that of the network device under the UMA structure. But when it accesses the remote memory (for example, the local memory of CPU B), it needs to pass through the interconnect bus between processors (such as the QPI bus). The bus forwards its request to access the memory to CPU B, and then CPU B processes the request, reads and writes the local memory, and returns the read and write results to CPU A. The latency introduced by the bus protocol between processors, and the replication of data through two different processor cores and memory, resulting in poor performance of NUMA structures when accessing remote memory.

In addition, the NUMA structure refers to a processor (possibly multicore) that shares the same memory as a Node and a Socket at the board level. A board can have 2, 4, 8 and more Sockets. At the logical level, this board divides the memory and processing unit into 2, 4, and 8 Nodes. Inter-local memory is accessed between different Nodes through interconnect bus interconnects between processors.

In addition, it should be noted that the execution unit in step S304 is a software executable. In an alternative scenario, the NUMA-based network device has two processors, each with multiple cores, and the cores in all processors are divided into three independent execution units, as shown in FIG. 9. As shown, the three independent execution units are execution unit 0, Execution unit 1 and Execution unit 2. The three execution units can exchange information and forward messages through shared memory (remote access through the interconnect bus between the CPUs). Each execution unit has its own fixed core, memory, file system and other system resources. The cores of the execution unit 0 can be selected one or several from the CPU A and the CPU B, and the memory can also be arbitrarily selected from the local memory of the CPU A and the CPU B. The cores of the execution unit 1 must be selected from the CPU A, The memory must also be selected from CPU A's local memory. The cores of the execution unit 2 must be selected from CPU B, and its memory must also be selected from CPU B's local memory.

Step S306, perform mapping processing on the first distributed structure and the multiple execution units to obtain a second distributed structure.

In step S306, the distributed software based on the network device in FIG. 6 is mapped on the three execution units in FIG. 9, and the mapping relationship is as shown in FIG. 10. Specifically, the execution unit 0 executes the CP program of the distributed software of the network device, and the execution unit 1 runs the DP program and is named DP1; the execution unit 2 runs the DP program and is named DP2.

It should be noted that the fabric in the distributed architecture of the network device in FIG. 6 is mapped to FIG. 9, and is replaced by an inter-CPU interconnect bus (such as a QPI bus).

Step S308, according to the second distributed structure, the plurality of executables to process network data traffic in the local memory.

Based on the solution defined in the foregoing steps S302 to S308, it can be known that, by acquiring the first distributed structure corresponding to the program based on the first storage structure, and simultaneously dividing the network device based on the second storage structure into multiple execution units. Then, the first distributed structure is mapped to the plurality of execution units to obtain a second distributed structure, and finally, the plurality of execution units is controlled to process network data traffic in the local memory based on the second distributed structure, wherein the program is used for processing network data traffic in local memory, multiple execution units are used to execute programs.

It is easy to note that in the second distributed structure, the execution unit only accesses the network data traffic in the local memory of the corresponding processor, that is, each execution unit is allocated only to the local memory of the processor when the memory is divided. The local memory of the remote processor eliminates the possibility of the data plane accessing the remote memory during processing the data packet, thereby ensuring the execution efficiency of the execution unit of each data plane under the NUMA structure.

It can be seen that the method for processing data based on the distributed structure described herein can achieve the purpose of improving the data access capability of the network device based on the NUMA structure. Therefore, improves the processing capability of the network device. The technical difficulty of performance degradation caused by migrating the software program of the network device based on the UMA structure to the hardware platform of the network device based on the NUMA structure is further resolved.

In an optional solution, the first distributed structure corresponding to the program based on the first storage structure is obtained, including:

Step S3020: Determine whether the program of the first storage structure supports the first distributed structure.

Step S3022: If the program of the first storage structure supports the first distributed structure, obtain a first distributed structure corresponding to the program based on the first storage structure.

It should be noted that, in the case that the program of the first storage structure does not support the first distributed structure, that is, the software under the UMA structure does not support the distributed structure, that program is modified to support the distribution structure.

In addition, it should be noted that the network device has at least one processor, each processor has multiple processing units. Wherein each of the multiple execution units has a corresponding processor, processing network data traffic is done by accessing the corresponding processor local memory. It is easy to note that the processing unit of each processor is the core of the processor. In addition, the plurality of execution units includes at least: one first execution unit for executing a control program of the network device, and at least one second execution unit for processing the network data traffic in the local memory.

Taking FIG. 9 as an example, the first execution unit is the execution unit 0 for executing the CP program; the second execution unit is the execution unit 1 and the execution unit 2 for executing the DP program.

In an optional solution, where the number of processors is multiple, the first execution unit processes network data traffic in a local memory of any one of the multiple processors; the second execution unit processes network data traffic in the local memory of the corresponding processor in multiple processors. For example, the cores of Execution unit 0 in FIG. 9 can be selected from CPU A and CPU B, and its memory can be arbitrarily selected from the local memory of CPU A and CPU B. The core of Execution unit 1 must be from the CPU A, and its memory must also be selected from CPU A's local memory; the core of execution unit 2 must be selected from CPU B, and its memory must also be selected from CPU B's local memory.

It should be noted that data is forwarded between the first execution unit 1 and at least one second execution unit 2 via an inter-CPU interconnect bus (i.e., a QPI bus). In the case where the number of the second execution unit is plural, data is transferred between the pluralities of second execution units via the bus. In addition, multiple execution units perform information interaction by means of memory sharing.

In addition, it should be noted that the root cause of the performance degradation caused by the simple migration of software based on UMA network devices to the NUMA platform is that DP requires a large amount of access to remote memory during packet processing. After the distributed software architecture of the network device is applied to the NUMA-based network device, DP1 and DP2 run on two different Execution unit 1 and Execution unit 2, respectively. Each execution unit is distributed on the cores of CPU A and CPU B. At the same time, each DP execution unit allocates only local physical memory during memory dividing, and does not allocate remote physical memory. Therefore, the distributed software architecture described herein fundamentally eliminates the possibility of the data plane accessing the remote memory during the packet processing, thereby ensuring the execution efficiency of each DP execution unit of the NUMA architecture.

In some embodiments, the method for processing data based on the distributed structure described herein may be implemented by using host virtualization technology, where the host virtualization technology may be, but not limited to, Linux KVM, VMware ESXi, Mircosoft Hyper-V, Oracle VirtualBox, Xen, etc.

As shown in FIG. 11, VM0-CP is the CP execution unit and VM1-DP1 and VM2-DP2 are the DP execution unit. The CP execution unit and the DP execution unit run separately in different virtual machines VM0, VM1 and VM2. The CP execution unit VM0 can allocate memory and CPU computing resources from CPU A and CPU B at the same time, DP execution unit VM1 only allocates memory and CPU computing resources from CPU A, and DP execution unit VM2 allocates only memory and CPU computing resources from CPU B, thus DP execution units VM1 and VM2 can be guaranteed to allocate memory and CPU computing resources only locally, so that efficient network data processing performance can be achieved.

In another alternative, a Linux-based container technology may be employed to implement the distributed method for processing data according to one or more embodiments described herein, wherein the overhead of the container-based system is generally smaller than the virtual machine's overhead, for example, Docker, LXC, CoreOS, etc. As shown in FIG. 12, Container0-CP is the CP execution unit, and Container1-DP1 and Container2-DP2 are the DP execution units. The CP execution unit and the DP execution unit run in different containers Container0, Container1 and Container2 respectively. The CP execution unit Container0 can allocate memory and CPU computing resources from both CPU A and CPU B. The DP execution unit Container1 allocates memory and CPU computing resources only from CPU A. The DP execution unit Container2 only allocates memory and CPU computing resources from CPU B. In this way, the DP execution units Container1 and Container2 can be guaranteed to allocate memory and CPU computing resources locally, so that efficient network data processing performance can be achieved.

It should be noted that in the above process, the CP execution unit can also be run in the host.

Embodiment 2

According to an embodiment, there is also provided a device embodiment for processing data based on a distributed structure, the device may perform the method for processing data based on a distributed structure in Embodiment 1, wherein FIG. 13 is a block diagram of a device structure for processing data based on a distributed structure according to an embodiment, as shown in FIG. 13, the device includes: an extracting module 1301, a processing module 1303, a mapping module 1305, and a control module 1307.

The extracting module 1301 is configured to obtain a first distributed structure corresponding to the program based on the first storage structure, where the program is used to process network data traffic in the local memory, and the processing module 1303 is configured to be based on the second storage structure. The network device is divided into a plurality of execution units, wherein the plurality of execution units are used to execute the program; the mapping module 1305 is configured to perform mapping processing on the first distributed structure and the plurality of execution units to obtain a second distributed structure; The module 1307 is configured to control, according to the second distributed structure, the plurality of execution units to process network data traffic in the local memory.

It should be noted that the foregoing extracting module 1301, the processing module 1303, the mapping module 1305, and the control module 1307 correspond to steps S3020 to S3022 in Embodiment 1, and the two modules are the same as the examples and application scenarios implemented by the corresponding steps. However, it is not limited to the content disclosed in the above embodiment 1.

In an optional solution, the extracting module includes: a determining module and an acquiring submodule. The determining module is configured to determine whether the program of the first storage structure supports the first distributed structure, and the acquiring submodule, configured to acquire, according to the first distributed structure, the first distributed structure corresponding to the program of the first storage structure.

It should be noted that the foregoing determining module and the acquiring submodule correspond to steps S302 to S308 in Embodiment 1, and the four modules are the same as the examples and application scenarios implemented by the corresponding steps, but are not limited to the above-mentioned Embodiment 1 Content.

In an optional solution, the network device has at least one processor, each processor having a plurality of processing units, wherein each of the plurality of execution units has a corresponding processor, and controls the plurality of processing units to process network data traffic in the corresponding processor local memory.

The plurality of execution units includes at least: one first execution unit and a at least one second execution unit, wherein the first execution unit is configured to run a control program of the network device, and the at least one second execution unit is configured to process network data traffic in the local memory. In a case where the number of processors is multiple, the first execution unit processes network data traffic in a local memory of any one of the plurality of processors; the second execution unit processes network data traffic in a local memory of a corresponding processor of the plurality of processors. The data is forwarded between the first execution unit and at least one second execution unit through an interconnection bus between the processors. In the case where the number of the second execution units is plural, the plurality of second execution units forward data through the interconnection bus between the processors.

Embodiment 3

According to another aspect of an embodiment, there is further provided a storage medium for storing a stored program and data, wherein the program executes the method of processing data based on the distributed structure in Embodiment 1.

Embodiment 4

According to another aspect of an embodiment, there is further provided a processor for executing a program, wherein the method of processing data based on the distributed structure in Embodiment 1 is executed while the program is running.

The order numbers of the embodiments are merely for the description, and do not represent the advantages and disadvantages of the embodiments.

In the above-mentioned embodiments, the descriptions of the various embodiments are different, and the parts that are not detailed in a certain embodiment can be referred to the related descriptions of other embodiments.

In the several embodiments provided by the present application, it should be understood that the disclosed technical contents may be implemented in other manners.

The device embodiments described above are only schematic. For example, the division of the unit may be a logical function division. In actual implementation, there may be another division manner, for example, multiple units or components may be combined or may be Integrate into another system, or some features can be ignored or not executed.

In addition, the mutual coupling or direct coupling or communication connection shown or discussed may be an indirect coupling or communication connection through some interface, unit or module, and may be electrical or otherwise.

The units described as separate components may or may not be physically separated, and the components displayed as units may or may not be physical units, that is, may be located in one place, or may be distributed to a plurality of units.

Some or all of the units may be selected according to actual needs to achieve the purpose of the solution of the embodiment.

In addition, each functional unit in each embodiment may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable storage medium. Based on such understanding, the technical solution described herein, in essence or in part, or all or part of the technical solution may be embodied in the form of a software product stored in a storage medium. A number of instructions are included to cause a computer device (which may be a personal computer, server or network device, etc.) to perform all or part of the steps of the methods described in various embodiments.

The foregoing storage medium includes: a U disk, a Read-Only Memory (ROM), a Random-Access Memory (RAM), a removable hard disk, a magnetic disk, or an optical disk, and the like, which can store program code.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

We claim:

1. A method for processing network data traffic, the method comprising:
    obtaining a first distributed structure corresponding to a program based on a first storage structure, wherein the program is configured to process network data traffic;
    dividing a network device based on a second storage structure into a plurality of execution units, wherein the plurality of execution units is configured to execute the program;
    mapping the first distributed structure and the plurality of execution units to obtain a second distributed structure; and
    controlling the plurality of execution units to process network data traffic based on the second distributed structure;
    wherein the plurality of execution units includes a first execution unit and a second execution unit, the first execution unit is configured to control the network device, and the second execution unit is configured to process at least some of the network data traffic.

2. The method according to claim 1, wherein the act of obtaining the first distributed structure comprises:
    determining whether the program supports the first distributed structure; and
    obtaining the first distributed structure corresponding to the program if the program supports the first distributed structure.

3. The method according to claim 1, wherein network device has at least one processor, and the at least one processor has a plurality of processing units.

4. The method according to claim 1, wherein the plurality of execution units has corresponding processors.

5. The method according to claim 1, wherein the network device comprises a plurality of processors; and
    wherein the first execution unit is configured to perform data access and process in a processor memory, and the second execution unit is configured to perform data access and process in a local memory of a corresponding processor.

6. The method according to claim 1, wherein the first execution unit and the second execution unit are configured to forward data through an interconnect bus between processors.

7. The method according to claim 1, wherein the plurality of execution units includes a first execution unit and multiple second execution units, and wherein the multiple second execution units are configured to forward data through an interconnect bus between processors.

8. The method according to claim 1, wherein the program is configured to process the network data traffic in a local memory.

9. A non-transitory computer-readable storage medium having a program, wherein the program is configured to perform the method of claim 1.

10. A processor configured to run a program embodied in a non-transitory computer-readable medium, wherein the program is configured to perform the method of any one of claims 1 to 8.

11. An apparatus comprising:
an extracting module configured to obtain a first distributed structure corresponding to a program based on a first storage structure, where the program is configured to process network data traffic;
a processing module configured to divide a network device based on a second storage structure into a plurality of execution units, where the plurality of execution units is configured to execute the program;
a mapping module configured to map the first distributed structure and the plurality of execution units, and to obtain a second distributed structure; and
a control module configured to control the plurality of execution units to process network data traffic based on the second distributed structures;
wherein the plurality of execution units includes a first execution unit and a second execution unit, the first execution unit is configured to control the network device, and the second execution unit is configured to process at least some of the network data traffic.

12. The method according to claim 4, wherein at least one of the processors is configured to control a plurality of processing units to process the network data traffic.

* * * * *